United States Patent

Guillot et al.

[11] Patent Number: 5,890,677
[45] Date of Patent: *Apr. 6, 1999

[54] DEVICE FOR DE-ICING AN EXTERNAL WALL OF A VEHICLE

[75] Inventors: Didier Marie Jean Pierre Guillot, Saint Chamas; Didier Houssat, Mandelieu, both of France

[73] Assignee: Eurocopter France, Marignane Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 873,240

[22] Filed: Jun. 11, 1997

[30] Foreign Application Priority Data

Jun. 11, 1996 [FR] France .................... 96 07210

[51] Int. Cl.$^6$ .................................................. B64D 15/18
[52] U.S. Cl. .................................. 244/134 A; 244/134 F
[58] Field of Search ............................ 244/134 A, 134 R, 244/134 E, 134 F

[56] References Cited

U.S. PATENT DOCUMENTS

| | | | |
|---|---|---|---|
| 2,373,255 | 4/1945 | McGoldrick | 244/134 A |
| 2,439,458 | 4/1948 | Eaton . | |
| 2,515,519 | 7/1950 | Lawrence et al. | 244/134 A |
| 2,663,522 | 12/1953 | Lawrence | 244/134 A |
| 2,753,138 | 7/1956 | MacIntyre | 244/134 A |
| 2,883,129 | 4/1959 | MacIntyre | 244/134 R |
| 3,704,720 | 12/1972 | Kaiser | 244/134 A X |
| 3,720,388 | 3/1973 | Kaatz et al. | 244/134 A |
| 4,733,834 | 3/1988 | Phillips, II | 244/134 A X |
| 4,735,554 | 4/1988 | Phillips, II | 244/134 A X |
| 4,865,291 | 9/1989 | Briscoe et al. | 244/134 A X |
| 5,035,380 | 7/1991 | Weisend et al. | 244/134 A |
| 5,160,102 | 11/1992 | Hlavac | 244/134 A |

FOREIGN PATENT DOCUMENTS 0234418  9/1987  European Pat. Off. .

*Primary Examiner*—William Grant
*Attorney, Agent, or Firm*—Fisher, Christen & Sabol

[57] ABSTRACT

A device for de-icing an external wall of a vehicle, of the type including a flexible covering (8) capable of at least partially covering the wall, and a compressor (9) whose delivery orifice (9B) is connected to the flexible covering in order to inflate it, via a control component (10). Advantageously, the intake orifice (9A) of the compressor (9) is connected to the flexible covering (8) via a controllable connection (11) which allows depressurization of the flexible covering and, when the pressure reduction reaches a predetermined value, feeds outside air to the compressor.

5 Claims, 2 Drawing Sheets

DEVICE FOR DE-ICING AN EXTERNAL WALL OF A VEHICLE

BACKGROUND OF THE INVENTION

1. Field of the Invention

The present invention relates to a device for de-icing an external wall of a vehicle.

More particularly, although not exclusively, the de-icing device is, according to the invention, intended to be fitted to the control surfaces, ailerons, flaps, wings, empennages and the like of aircraft, for example airplanes and helicopters.

2. Background Art

This is because, as is known, when aircraft pass, in the course of their use, through regions in which the weather conditions are harsh and unfavorable, ice can form over a relatively long time on these aerodynamic surfaces, and this may consequently cause them to malfunction, with possibly serious consequences for the control of the aircraft. These aerodynamic surfaces are thus fitted with de-icing devices, which may be of the type with an electrical resistor or an inflatable covering.

In the latter case, which is the case to which the invention relates, known de-icing devices include a flexible covering which at least partially covers said surface, and a compressor for inflating said covering. When ice forms on the aerodynamic surface, with the risk of making it difficult or impossible for it to operate, pressurized gas is fed into the covering, via the delivery orifice of the compressor, which may be that of the jet engine. The covering expands, with the result that the layer of ice breaks into a large number of pieces and is then ejected from said surface.

The supply of compressed gas outlet by the compressor is then interrupted, so that the flexible covering deflates and resumes its initial position on the surface, the compressed gas being discharged to the outside through a valve or equivalent. As soon as ice begins to form again, another inflation/deflation cycle is performed.

U.S. Pat. No. 2,883,129 discloses a device of this type, including:

- a flexible covering, at least partially covering the external wall of the vehicle;
- a compressor; and
- a control component where connections, respectively originating from the intake orifice and the delivery orifice of said compressor terminate, said control component inducing either inflation or depressurization of said flexible covering.

With a device of this type, it is thus possible, at the start of an operating cycle, to create a reduced pressure in the flexible covering by directly connecting it to the intake orifice of the compressor, so that the covering is pressed against the aerodynamic surface (external wall), and this may start to break the ice which is being formed. The depressurized covering is then inflated to the predetermined value by connecting it, via the control component, to the delivery orifice of the compressor (the intake orifice no longer being connected to the covering) which, by expansion, causes the ice to break (this having already started during the depressurization) and to be detached from the covering. This depressurization thus plays a part in starting to break the ice, contributing to quicker and more efficient removal of the ice. In addition, establishing a reduced pressure makes it possible to obtain a large absolute pressure range (the difference between the inflation pressure and the pressure reduction), while remaining within acceptable working limits for the covering which contracts and undergoes expansion during an operating cycle of the device.

BROAD DESCRIPTION OF THE INVENTION

The object of the present invention is to optimize a device of this type.

To this end, according to the invention, the device described above is noteworthy in that:

- said connection connecting said intake orifice to said control component is equipped with an aeration valve with preset calibration, which allows depressurization of said flexible covering and which, when the pressure reduction in said covering reaches a predetermined value, allows outside air to be taken in by said compressor; and
- a reservoir for storing pressurized inflation fluid is arranged between said delivery orifice of the compressor and said control component.

It is thus possible to use the same connection for pressurizing and depressurizing the flexible covering, and this contributes to the simplicity of producing such a device, while said reservoir makes it possible to have an immediately available volume of pressurized fluid, making it possible to inflate the flexible covering quickly and consequently to break and remove the ice more efficiently. A reservoir of this type also makes it possible to reduce the mass and bulk of the compressor.

Preferably, said control component is of the distributor type.

Advantageously, low-pressure and high-pressure sensors are respectively provided between the intake orifice of said compressor and said flexible covering, and between the delivery orifice of said compressor and said control component. In addition, a discharge solenoid valve is connected to said pressurized-fluid storage reservoir, and this makes it possible to avoid an overpressure in the reservoir.

According to another feature, the device comprises a control unit to which said compressor, said control component and said pressure sensors are connected, for driving the operation of said flexible covering in a predetermined cycle.

Said compressor may also be driven by means of a power source, for example electrical.

BRIEF DESCRIPTION OF THE DRAWINGS

The figures of the appended drawing will clearly show how the invention may be embodied. In these figures, identical references denote similar elements.

DETAILED DESCRIPTION OF THE INVENTION

Figure 1:
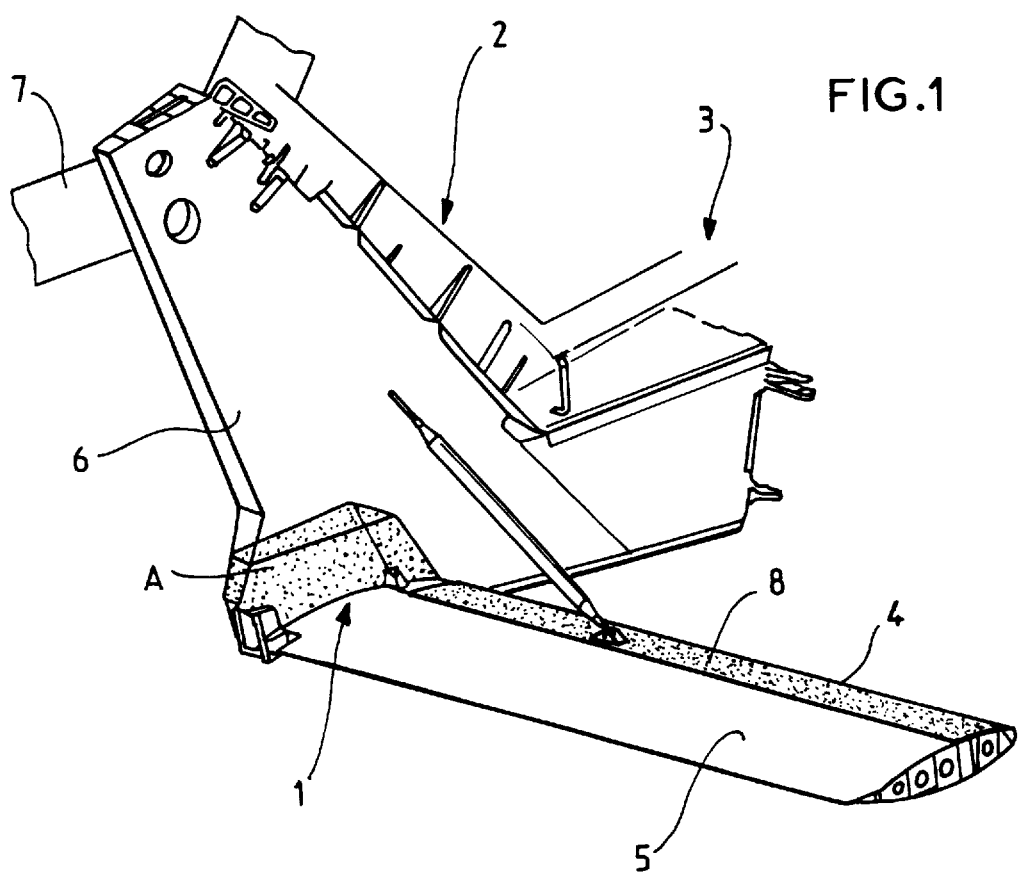
FIG. 1 represents, in perspective and in this application, the rear of a helicopter whose empennage is equipped with the de-icing device according to the invention.

In the application shown in FIG. 1, the de-icing device 1 according to the invention is installed at the tail stabilizer 2 of a helicopter 3 in order to act on the leading edge 4 of the horizontal stabilizer 5 of the helicopter, located to one side of the fin 6. To the other side of this fin, there is the anti-torque rotor 7, partially illustrated.

It is obvious that a de-icing device of this type could be provided on any other aerodynamic surface of an aircraft, should it become necessary to prevent the formation of ice thereon.

As schematically shown by FIG. 1, the de-icing device 1 mainly comprises a flexible covering 8, illustrated by dots, which encloses the leading edge 4 of the horizontal stabilizer 5 while being fixed thereto in a suitable manner, known per se, in particular adhesive bonding, and an assembly A, illustrated in dots and comprising a compressor 9 for inflating the covering through a control component 10, as well as other parts which will be dealt with in detail below. In particular, FIG. 1 shows that the assembly A is located in the fin 6 of the empennage 2, in proximity to the covering 8, which makes the device 1 considerably compact.

Figure 2:
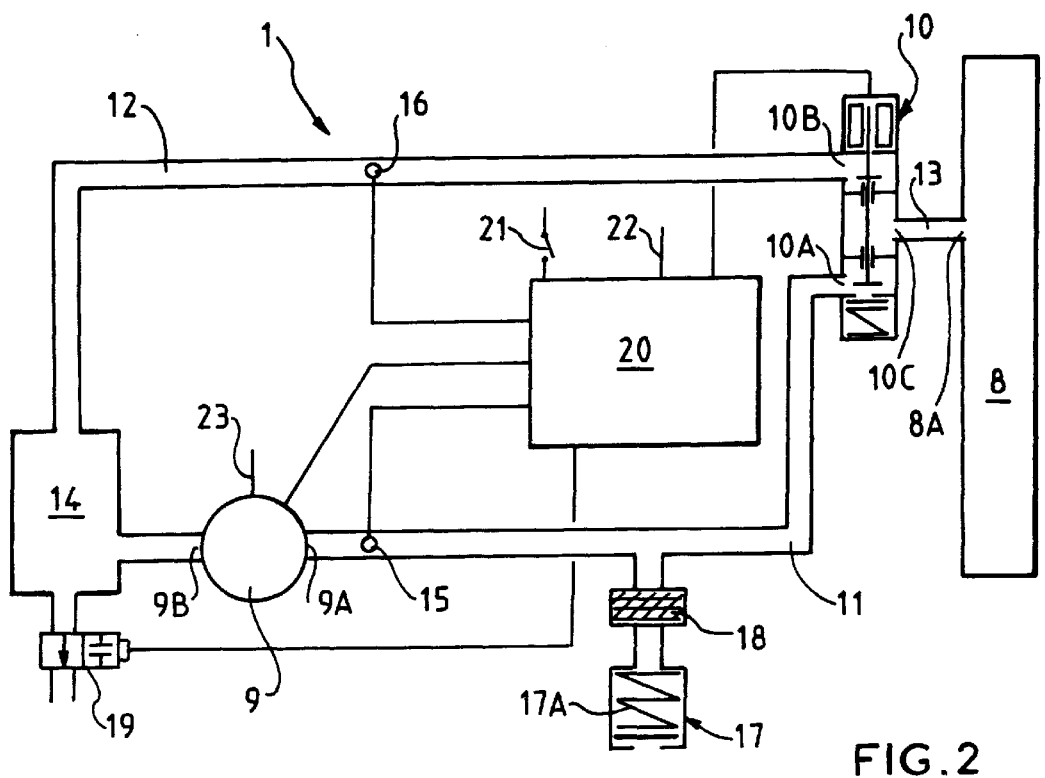
FIG. 2 shows an illustrative embodiment of said de-icing device.

According to the invention, and in this particular embodiment shown in FIG. 2, the intake orifice 9A and the delivery orifice 9B of the compressor are both connected to the flexible covering 8 via the control component 10. In particular, a first controllable connection or conduit 11 connects the intake orifice 9A to an inlet 10A of the control component a second connection or conduit 12 connects the delivery orifice 9A to an inlet 10B of said component, and a third connection or conduit 13, for example a hose, connects an outlet 10C of said component to a single inlet/outlet 8A of the covering. This control component 10 is then, in this case, a switching device such as a solenoid distributor with two inlets and one outlet, and with three operating positions, of a type which is known per se.

In addition, a reservoir 14 for storing pressurized inflation fluid is arranged on the second connection 12, between the delivery orifice 9B of the compressor and the corresponding inlet 10B of said component. The presence of a reservoir 14 of this type makes it possible to have a compressor 9 which is less heavy and is more compact, as well as an immediately and directly available volume of pressurized fluid.

In addition, a low-pressure sensor 15 is arranged on the first connection 11, the role of which sensor is to detect that the desired pressure reduction in the flexible covering 8 has been achieved. A high-pressure sensor 16 is also arranged on the second connection 12, the role of which sensor is to detect that the appropriate pressure in the flexible covering has been achieved. An aeration valve 17 with preset calibration, provided by a spring 17A, is also connected on the first connection 11, between the solenoid distributor 10 and the sensor 15. Its role is to allow outside air to be let into the connection 11 when the reduced pressure in the flexible covering reaches a limit value, corresponding to the calibration of the spring 17A. A filter 18 is moreover provided between the aeration valve 17 and the first connection 11 in order to prevent impurities and water from being introduced into the circuit of the device 1. Finally, a discharge solenoid valve 19 is connected to the pressurized-fluid storage reservoir 14 in order to prevent an overpressure in the second connection 12 and to purge the reservoir 14.

The solenoid distributor 10, the sensors 15 and 16, the compressor 9 and the solenoid valve 19 are connected to a control unit 20 which can be operated by a switch 21. The control unit 20 and the compressor 9 are also connected to separate electrical power supplies, 22 and 23, respectively.

The de-icing device 1 is operated from the control unit 20 as follows.

Figure 3:
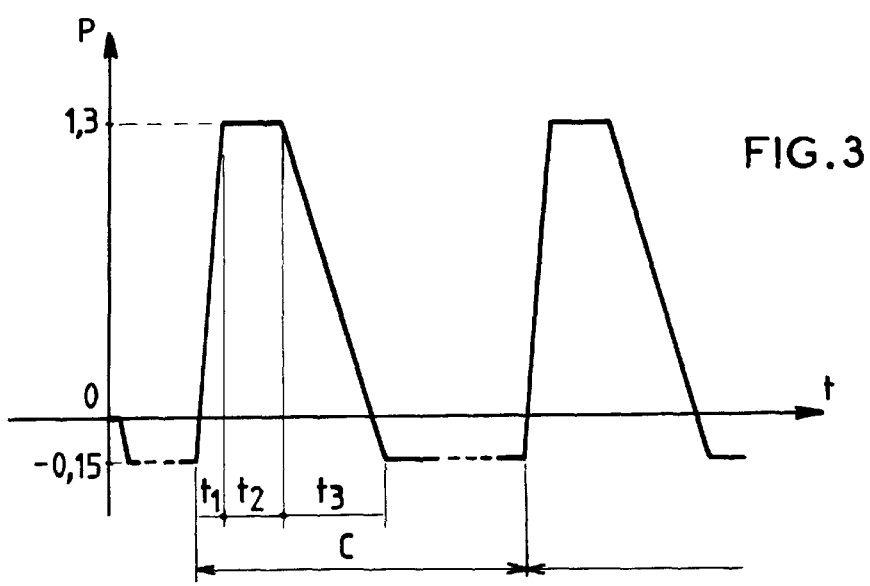
FIG. 3 is a graph illustrating a cycle of inflation/deflation of the flexible covering of the device.

Initially, the device 1 has the configuration illustrated in FIG. 2, in which the solenoid distributor 10 occupies a neutral position and the compressor 9 is inactive. There is consequently no pressure in the flexible covering 8. On the graph illustrated in FIG. 3, this situation corresponds to the origin O before the initiation of the operating cycle of the device, where the pressure P, plotted on the ordinate, is zero for a time t plotted on the abscissa.

Starting from this initial configuration, the compressor 9 is actuated by the supply 23 and the unit 20, and the solenoid distributor 10 is controlled so as to connect its inlet 10A to the outlet 10C, which connects the first, intake, connection 11 to the interior of the flexible covering 8, via the third connection 13. At this moment, a reduced pressure is created in the flexible covering and is maintained therein. At the same time, from its delivery orifice 9B, the compressor 9 pressurizes the fluid, such as air, contained in the reservoir 14 and raised along the second, delivery, connection 12, which is closed off at the inlet 10B of the solenoid distributor 10. When the desired pressure reduction is achieved, a fact which is communicated by the sensor 15, the flexible covering 8 is kept pressed against the horizontal stabilizer 4. The constituent material of the covering has contracted within acceptable limits, and this has also led to incipient fracture of the ice being formed on the covering. By way of example, the reduced pressure created in the covering is +0.15 bar. When the reduced pressure becomes equal to the calibrated value of the valve 17, the latter opens so that the compressor takes in air from the outside. When the desired pressure is achieved in the reservoir, the control unit cuts the power supply to the compressor.

When the ice is to be removed from the flexible covering, the operating cycle C of the device can start.

The solenoid distributor 10 is controlled so as to connect its inlet 10B to its outlet 10C, that is to say connect the second, delivery, connection 12 to the flexible covering 8, via the third connection 13. This change in position of the solenoid distributor closes the connection 11 to the covering. Since the reservoir 14 is advantageously pressurized to the desired pressure, defined by the sensor 16, the pressurized fluid is immediately available to inflate the flexible covering 8 to the desired pressure and to maintain this pressure. By virtue of this, the inflation time t1 is extremely short, about 1 s, to reach a pressure of 1.3 bar and maintain it for a time t2 of 6. The material of the flexible covering 8 then undergoes an abrupt expansion, which causes the ice to break and thereupon to be removed from its outer surface. Clearly, the pressures and the times which have been indicated could be different.

The cycle continues and the solenoid distributor 10 is again controlled so as to change position and allow the pressure reduction in the flexible covering 8 to be resumed. To do this, the first, intake, connection 11 is connected to the third connection 13, while the second, delivery, connection 12 is closed off from the solenoid distributor. At this moment, the flexible covering 8 can deflate for a time t3 of 10 s to obtain and maintain the initial pressure reduction, until the end of the operating cycle. The reservoir 14 is again under pressure by means of the delivery orifice 9B of the compressor and is then ready to deliver pressurized fluid.

The duration of an operating cycle C of the device depends on the weather conditions encountered, and may be between 1 min 30 s and 5 min between two successive inflation phases of the flexible covering. A plurality of other inflation cycles may thus take place consecutively or intermittently in order to remove the ice and keep the horizontal stabilizer 4 continuously operational.

The values of the pressure reduction and the inflation pressure may be different, insofar as the constituent material 6f the flexible covering so allows. It will thus be noted that the act of depressurizing the covering makes it possible to use a larger absolute pressure range

We claim:

1. A device for de-icing an external wall of a vehicle, comprising:

a flexible cover (8), at least partially covering said wall and having a single orifice (8A);

a compressor (9) having an intake orifice (9A) and a delivery orifice (9B);

a distributor (10) having a first inlet (10A), a second inlet (10B) and an outlet (10C), said outlet (10C) being connected to said single orifice (8A) of said flexible covering (8);

a first connection (11) connecting said intake orifice (9A) of said compressor (9) to said first inlet (10A) of said distributor (10);

a second connection (12) connecting said delivery orifice (9B) of said compressor (9) to said second inlet (10B) of said distributor (10);

an aeration valve (17) with preset calibration mounted in said first connection (11), and allowing outside air to be let into said first connection (11) when the pressure in said flexible covering (8) reaches a limit reduced value;

a storage reservoir (14) arranged in said second connection (12); and a control means (20) controlling said distributor (10) according to operating cycles, each of said operating cycles including:

a depressurization phase during which said distributor (10) connects said first inlet (10A) and said outlet (10C) and comprising:

a first step during which said aeration valve (17) is closed, allowing depressurization of said flexible covering (8) and pressurization of the air in said storage reservoir (14), said first step ending when said aeration valve (17) opens;

a second step during which said aeration valve (17) is open, allowing outside air to be taken in by said compressor (9); and an inflation phase during which said distributor (10) connects said second inlet (10B) and said outlet (10C), allowing compressed air stored in said reservoir (14) to inflate said flexible covering (8).

2. The device of claim 1, wherein a first pressure sensor (15) is provided in said first connection (11) and is connected to said control means (20).

3. The device of claim 1, wherein a second pressure sensor (16) is provided in said second connection (12) and is connected to said control means (20).

4. The device of claim 1, wherein a discharge solenoid valve (19), controlled by said control means (20), is connected to said storage reservoir (14).

5. The device of claim 1, wherein said compressor is controlled by said control means (20).

* * * * *